Patented May 5, 1953

2,637,679

UNITED STATES PATENT OFFICE 2,637,679

INTRAMUSCULARLY - ADMINISTRABLE PROLONGED - ACTION PENICILLIN PRODUCTS

William E. Gaunt, Dunellen, Elliot Bartner, Lake Nelson, and Hans A. Schaeffer, Elizabeth, N. J., assignors, by mesne assignments, to Mathieson Chemical Corporation, Baltimore, Md., a corporation of Virginia No Drawing. Application July 14, 1948, Serial No. 38,746

8 Claims. (Cl. 167—58)

This invention relates to intramuscularly-administrable, prolonged-action penicillin preparations, i. e., preparations which, on injection intramuscularly, provide a prolonged effective level of the penicillin in the blood.

Prior to this invention, prolonged penicillin action was obtained by intramuscular injection of water-soluble salts of penicillin in oily media containing various substances retarding the absorption of the penicillin, inter alia, beeswax and water-insoluble soaps. More recently, it was found that certain water-insoluble salts of penicillins, notably procaine-penicillin G, could be administered in oily media to obtain prolonged action, either without addition of such absorption-retarding substances, or with such substances (thus obtaining an even more prolonged penicillin action).

The prolongation of absorption obtained by the use of procaine-penicillin G is due to the low water-solubility of this salt, and consequent slow breakdown after administration (with slow release of penicillin).

Inasmuch as the use of an oil (or oil and wax) medium is attended by a number of disadvantages [inter alia, the potentially allergenic nature of the oil and wax, frequent occurrence of pain on injection, occasional formation of severe indurations on injection, possibility of oil embolisms, requirement of exacting conditions for administration, and difficulty of cleaning the needle and syringe], an attempt has been made to provide an aqueous preparation of procaine-penicillin, relying solely on the slow breakdown of the procaine-penicillin for prolonged action. For this purpose, the procaine-penicillin was suspended in water with the aid of an intramuscularly-acceptable surface-active agent (such as a polyoxyethylene derivative of a partial higher fatty acid ester of sorbitan, e. g., a Tween). Although the surface-active agent wetted the crystals of procaine-penicillin and thus facilitated suspension and minimized clump formation, and the procaine-penicillin was quite stable in the aqueous medium, the procaine-penicillin settled out rather rapidly, and, when the preparation was administered from a syringe, the plunger had a tendency to freeze in the barrel.

It is the object of this invention to provide aqueous-vehicle, intramuscularly-administrable, prolonged-action penicillin preparations which are relatively stable and capable of being readily administered by an ordinary glass syringe; and it is an additional object of this invention to provide substantially-dry, stable compositions capable of uniform suspension in aqueous vehicles (as well as aqueous compositions adapted for use as vehicles) to provide such preparations, and methods of producing these compositions.

The (preferred) substantially-dry compositions of this invention essentially comprise a substantially water-insoluble salt of a penicillin (especially procaine-penicillin G), an intramuscularly-acceptable surface-active agent (especially a polyoxyethylene ether of a partial higher fatty acid ester of soribtan), and an intramuscularly-acceptable hydrophilic colloid (especially a sodium carboxymethylcellulose). [By "intramuscularly-acceptable" is meant, of course, that the substance so qualified, on injection intramuscularly in the amount involved, is acceptable from a physiological standpoint, i. e., is non-toxic, etc]. Such compositions, on addition of water, readily suspend without clump formation; and the suspensions are of enhanced stability and form readily-injectable preparations providing prolonged penicillin blood levels.

These preferred compositions are advantageously prepared by forming a substantially-dry blend of the hydrophilic colloid (sterile, and in particulate form) with the substantially water-insoluble penicillin salt (also sterile, and in particulate form), and adding the blend to the substantially-dry surface-active agent; advantageously, the blend is subdivided by weight (to provide the desired penicillin-unitage) into vials containing the appropriate quantity of substantially-dry surface-active agent. Advantageously also, the surface-active agent is placed in the vial by volumetrically subdividing a solution thereof into the vials, and removing the solvent from the vials under sterile conditions. To prepare the aqueous preparations, the appropriate quantity of (sterile) aqueous vehicle is added to the vial, the vial is shaken to uniformly suspend the composition in the water, and the desired quantity of the aqueous preparation is withdrawn into a syringe for injection.

The utilizable substantially water-insoluble salts of penicillins comprise, inter alia, the procaine salts of the penicillins (inter alia, penicillin G, and dihydro penicillin F), and the salts of bases other than procaine, inter alia, aluminum-penicillin, beryllium-penicillin, and the malachite-green-base salt of penicillin (Science, 106, 370, 1947); the preferred penicillin salt being procaine-penicillin G.

Among surface-active agents utilizable for the purposes of this invention are the intramuscularly-acceptable members of the following groups: dialkyl esters of sodium sulfosuccinic acid [inter alia, the dihexyl ester (e. g. Aerosol MA) and the dioctyl ester (e. g., Aerosol OT)]; aryl alkyl polyether alcohols and derivatives thereof [inter alia, the aryl alkyl polyether alcohols (e. g., Triton A–20), and the sodium salts of aryl alkyl polyether alcohol sulfates ( e. g., Triton 770)]; fatty acid esters of polyethylene glycol (e. g., Emulsov O); and (especially polyoxyalkylene ethers of partial higher fatty acid esters of polyhydroxy alcohols, notably the polyoxyethylene ethers of partial higher fatty acid esters of sorbitans (e. g., the Tweens). Besides enabling rapid wetting of the particles of penicillin salt (and thus facilitating suspension thereof), the surface-active agent enables rapid wetting of the hydrophilic colloid; this cooperation of surface-active agent and hydrophilic colloid, and/or the preblending of the penicillin salt with the hydrophilic colloid minimizes lumping and/or formation of gelatinous masses on addition of the aqueous vehicle.

The hydrophilic colloids utilizable for the purposes of this invention comprise the intramuscularly-acceptable, water-soluble methylcelluloses, naturally-occurring gums (e. g., acacia and tragacanth), alginates, pectins, soluble starches, dextrins, gelatins, and (especially) cellulose gums [such as the sodium and other water-soluble salts of carboxymethylcellulose (e. g., CMC)].

The concentrations of surface-active agent and of hydrophilic colloid required in the (aqueous) penicillin preparations of this invention are very low, and satisfactory results may be obtained with a wide range of concentrations of each. Thus, without setting out the operative limits but merely as illustrating the low and wide variation of concentrations utilizable, sodium carboxymethylcellulose concentrations of 0.1% and 1.0%, and concentrations of Tween 80 (for example) as low as .01%, give satisfactory results.

The following examples are illustrative of the invention (sterile conditions being employed wherever necessary or desirable).

*Example 1*

A polyoxyethylene ether of partial oleic acid ester of sorbitan (e. g., Tween 80) is dissolved in n-butanol; the solution is sterile-filtered and volumetrically subdivided into 1.5 million unit vials so as to provide 5.4 mg. of the surface-active agent per vial; and the n-butanol is distilled off by heating. Then sodium carboxymethylcellulose (e. g., high-viscosity CMC, a cellulose ether made by reaction of monochloroacetic acid with alkali cellulose, and containing approximately 0.75 carboxymethyl group for each anhydroglucose unit in the cellulose molecule) is vacuum-dried and sterilized by tumbling at 140° C. for three hours; the granular powder is blended (by dry tumbling) with dry, sterile, crystalline procaine-penicillin G (made with sterile reactants under sterile conditions) in the ratio of 16 mg. CMC per 1.84 million units procaine-penicillin; a sufficient amount of the blend is weighed into the Tween-containing vials to provide 1.84 million units procaine-penicillin per vial; and the vials are capped. The composition in the vial is stable for at least 12 months.

On addition of 4.3 ml. sterile distilled water (Water for Injection), isotonic saline solution, or glucose solution U. S. P., and shaking, a uniform suspension is formed providing 5 x 1 ml. withdrawals each containing at least 300,000 units of procaine-penicillin. The sterile aqueous suspension formed may be kept at room temperature for over a week without significant loss of potency. The aqueous preparation is easily withdrawn, measured, and administered with a conventional needle and syringe, neither of which must be dry; and blocking of the needle is minimized, and the syringe and needle are easily cleaned.

The aqueous preparation can be used for systemic penicillin therapy for any condition in which the prior prolonged-action (oily-vehicle) penicillin preparations are effective. A single intramuscular injection (300,000 units) provides therapeutic blood levels for 24 hours in the majority of patients, and for 36 hours in about half the patients. By virtue of its containing no oil (or wax), pain following injection and allergenic reactions are minimal.

*Example 2*

For the preparation of 3-million-unit multiple-dose vials or 300,000-unit single-dose vials, the quantities of components used in the foregoing example are appropriately modified. In each case, the procaine-penicillin included and vehicle specified should be in such excess that the withdrawable contents of the vial will provide the desired unitage. Thus, for the single-dose vial, the addition of 1.2 ml. vehicle would be specified, to enable withdrawal of 1 ml. preparation from the vial.

*Example 3*

Sufficient sterile procaine-penicillin G is weighed into vials to provide the desired single or multiple dose, and the vials are capped; and as the vehicle, a sterile aqueous solution of CMC and Tween 80, is provided in a second vial, the amount and concentration of this solution being such that addition of (all or part of) the solution to the procaine-penicillin vial (and shaking) will provide an aqueous suspension of the proper composition (e. g., will provide a suspension of the same composition as that described in Example 1). Such vehicle may be prepared by dissolving the requisite amount of the Tween in water, sterile-filtering the solution, adding the requisite amount of the CMC (which has been heat-sterilized), and volumetrically subdividing the solution into the vials; or by dissolving the requisite amount of CMC in the (unsterilized) aqueous Tween solution, sterilizing the solution by autoclaving, and subdividing.

*Example 4*

The blend of procaine-penicillin G and CMC described in Example 1 is weighed into vials to provide the desired single or multiple dose; and, as the vehicle, a sterile aqueous solution of Tween 80 is provided in a second vial, the amount and concentration of this solution being such that addition of (all or part of) the solution to the procaine-penicillin in the first vial (and shaking) will provide an aqueous suspension of the proper composition.

*Example 5*

Tween 80 is placed in vials as described in Example 1, and sterile procaine-penicillin G is weighed into the Tween-containing vials; and as the vehicle, a sterile aqueous solution of CMC is provided in a second vial, the amounts, proportions and concentrations being such that addition of (all or part of) the solution in the second vial to the first vial (and shaking) will provide an aqueous suspension of the proper composition.

The invention may be variously otherwise embodied within the scope of the appended claims.

We claim:

1. A substantially-dry, stable composition capable of uniform suspension in an aqueous vehicle to provide an intramuscularly-administrable, prolonged-action, penicillin preparation, essentially comprising a substantially water-insoluble salt of a penicillin, an intramuscularly-acceptable surface-active agent, and an intramuscularly-acceptable hydrophilic colloid.

2. A substantially-dry, stable composition capable of uniform suspension in an aqueous vehicle to provide an intramuscularly-administrable, prolonged-action, penicillin preparation, essentially comprising procaine-penicillin G, an intramuscularly-acceptable surface-active agent, and an intramuscularly-acceptable hydrophilic colloid.

3. A substantially-dry, stable composition capable of uniform suspension in an aqueous vehicle to provide an intramuscularly-administrable, prolonged-action, penicillin preparation, essentially comprising a substantially water-insoluble salt of a penicillin, an intramuscularly-acceptable surface-active agent, and an intramuscularly-acceptable, water-soluble salt of a carboxymethylcellulose.

4. A substantially-dry, stable composition capable of uniform suspension in an aqueous vehicle to provide an intramuscularly-administrable, prolonged-action, penicillin preparation, essentially comprising a substantially water-insoluble salt of a penicillin, an intramuscularly-acceptable surface-active agent, and a sodium carboxymethylcellulose.

5. A substantially-dry, stable composition capable of uniform suspension in an aqueous vehicle to provide a intramuscularly-administrable, prolonged-action, penicillin preparation, essentially comprising an intramuscularly-acceptable surface-active agent, and a blend of a sodium carboxymethylcellulose powder and procaine-penicillin G crystals.

6. An intramuscularly-administrable, prolonged-action, penicillin preparation, essentially comprising a relatively-stable, uniform suspension of a substantially water-insoluble salt of a penicillin in a parenterally-administrable aqueous vehicle, containing an intramuscularly-acceptable surface-active agent and an intramuscularly-acceptable hydrophilic colloid.

7. An intramuscularly-administrable, prolonged-action, penicillin preparation, essentially comprising a relatively-stable, uniform suspension of crystalline procaine-penicillin G in a parenterally-administrable aqueous vehicle, containing an intramuscularly-acceptable surface-active agent and an intramuscularly-acceptable, water-soluble salt of a carboxymethylcellulose.

8. A therapeutic composition comprising a dry admixture of procaine penicillin, sodium carboxymethyl cellulose and polyoxyalkylene derivatives of sorbitan monooleate.

WILLIAM E. GAUNT.
ELLIOT BARTNER.
HANS A. SCHAEFFER.

References Cited in the file of this patent

UNITED STATES PATENTS

| Number | Name | Date |
| --- | --- | --- |
| 2,039,940 | Steinberg | May 5, 1936 |
| 2,166,074 | Reichel | July 11, 1939 |

FOREIGN PATENTS

| Number | Country | Date |
| --- | --- | --- |
| 515,566 | Great Britain | Dec. 8, 1939 |

OTHER REFERENCES

Drug and Cosmetic Industry, November 1947, page 595.

Drug and Cosmetic Industry, May 1946, page 697.

Proc. Staff Meetings Mayo Clinic, December 10, 1947, pages 567 to 570.

Science, February 13, 1948, pages 169 and 170.

"Spans and Tweens"—Atlas Powder Company, November 1942, pages 6 and 8.

"The Pulse of Pharmacy"—Wyeth, Inc., June 1948, pages 8 to 14.